United States Patent
Le Bars

(12) United States Patent    (10) Patent No.: US 7,596,186 B2
Le Bars    (45) Date of Patent: Sep. 29, 2009

(54) DEVICES AND METHODS OF MODULATION AND DEMODULATION ENABLING THE EXTENSION OR REPLACEMENT OF A COMMUNICATIONS LINK, CORRESPONDING SENDER AND RECEIVER

(75) Inventor: Philippe Le Bars, Thorigne-Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 687 days.

(21) Appl. No.: 11/204,031

(22) Filed: Aug. 16, 2005

(65) Prior Publication Data
US 2006/0056278 A1    Mar. 16, 2006

(30) Foreign Application Priority Data
Sep. 16, 2004   (FR)  .................................. 04 09855

(51) Int. Cl.
    *H04L 27/00*    (2006.01)
(52) U.S. Cl. .................. 375/298; 370/226; 370/243; 370/274; 370/315; 370/492; 398/18; 398/64; 455/7; 455/13.1; 455/14; 455/16; 342/353
(58) Field of Classification Search ................. 375/279, 375/295, 308; 332/103, 144; 370/226, 243, 370/274, 279, 315, 492, 501; 398/18, 64; 455/7–25; 342/353
See application file for complete search history.

(56) References Cited

U.S. PATENT DOCUMENTS

| | | | | |
|---|---|---|---|---|
| 4,989,219 | A | * | 1/1991 | Gerdes et al. ............... 375/286 |
| 5,623,511 | A | * | 4/1997 | Bar-David et al. .......... 375/143 |
| 6,084,852 | A | * | 7/2000 | Ebringer .................... 370/206 |
| 6,115,411 | A | * | 9/2000 | van Driest ................. 375/130 |
| 6,336,031 | B1 | * | 1/2002 | Schyndel ................... 455/41.2 |
| 7,039,120 | B1 | | 5/2006 | Thoumy et al. ............. 375/275 |
| 2003/0232607 | A1 | | 12/2003 | Le Bars et al. .............. 455/126 |
| 2004/0047363 | A1 | | 3/2004 | Burdin et al. ............... 370/442 |
| 2006/0036797 | A1 | | 2/2006 | Merlet et al. ............... 710/311 |

FOREIGN PATENT DOCUMENTS

| | | |
|---|---|---|
| EP | 1 063 808 | 12/2000 |
| EP | 1 331 775 | 7/2003 |
| FR | 2 827 721 | 1/2003 |
| FR | 2 850 506 | 1/2003 |

OTHER PUBLICATIONS

Kojei Fujii and A1, "A 60 GHz MMIC chipset for 1-G-bit/s Wireless link", Aligent Technology.

"GaAs components for 60 GHz Wireless Communication Application Velocium", presented on Apr. 11, 2002 at the GaAs Mantech Conference, San Diego, California.

* cited by examiner

*Primary Examiner*—Curtis B Odom
(74) *Attorney, Agent, or Firm*—Fitzpatrick, Cella, Harper & Scinto

(57) ABSTRACT

A modulation device comprises for each carrier frequency: means of discrimination between a signal coming from a first channel of a communications link and a signal coming from a second channel of said link, so as to obtain differentiated first and second signals; first assigning means, enabling the assigning of the first differentiated signal to one of the two modulation arms, and the second differentiated signal to the other of the two modulation arms. Furthermore, a corresponding demodulation device comprises, for each modulated carrier frequency: means for the determining, among the two signals received by the two demodulation arms, of the signal corresponding to a first differentiated signal and the signal corresponding to a second differentiated signal, as a function of a discrimination made at sending; second assigning means, enabling the received signal corresponding to the first differentiated signal to be assigned to a first channel of a communications link, and the received signal corresponding to the second differentiated signal to be assigned to a second channel of said link.

11 Claims, 12 Drawing Sheets

DEVICES AND METHODS OF MODULATION AND DEMODULATION ENABLING THE EXTENSION OR REPLACEMENT OF A COMMUNICATIONS LINK, CORRESPONDING SENDER AND RECEIVER

1. FIELD OF THE INVENTION

The field of the invention is that of communications networks used to interconnect a plurality of apparatuses (also called terminals), and especially, but not exclusively, home audiovisual networks used to interconnect analog and/or digital type audio and/or video devices so that they exchange audiovisual signals.

The above-mentioned apparatuses belong for example to the following list of apparatuses which is not exhaustive: television receivers (using satellite communications, RF frequencies, cable connections, xDSL, etc), video-cassette recorders, scanners, digital movie and television cameras, digital photography cameras, DVD readers, computers, personal digital assistants (PDA), printers, etc.

More specifically, the invention relates to a technique for the extension or replacement, by a wireless connection, of a link included in a communications network, this link interconnecting two nodes.

The invention can be applied in all cases where the link to be extended or replaced is of the type comprising a first channel and a second channel dedicated to the sending of information, and possibly a third channel and a fourth channel dedicated to the reception of information (in the case of two-way transmission).

In a first application, the invention enables the extension or replacement of a link of a communications network such as the one described in the French patent application number FR0300833 filed on 24 Jan. 2003. In this case, the network comprises two types of nodes: multimedia interface devices ("first nodes") and switching devices ("second nodes"). Each multimedia interface device is connected to a switching device by a first link. The switching devices are connected to each other by second links. The apparatuses are connected to the multimedia interface devices, by direct connection for the digital apparatuses, or through an analog/digital converter for the analog apparatuses. The analog apparatuses may also be connected directly to the multimedia interface devices. In this case, the invention enables the extending or replacement, by a wireless connection, of a first link (between the multimedia interface devices and a switching device) as well as a second link (between two switching devices).

In a second application, the invention enables the extension or replacement of a link of a communications network in which each node integrates multimedia interface means and switching means (respectively corresponding to the means included in a multimedia interface device and a switching device of the above-mentioned first application). The nodes are connected to one another by switching means. In this case, the invention enables the extension or replacement of any one of the inter-node links (i.e. links between switching devices contained in these nodes).

In the first and second applications mentioned here above (which are non-exhaustive examples), the links are typically CAT5 type cables. Each cable typically consists of four pairs of wires each forming a channel: two pairs dedicated to the sending of information and two pairs dedicated to the reception of information. Of the two pairs dedicated respectively to sending or reception, one pair transmits segments comprising most significant bits of the information bytes sent by the sending devices and the other pair transmits segments comprising least significant bits of information bytes sent by the sending devices.

In general, there now exists a need to extend or replace certain links (CAT5 type cables in the above examples) of the communications networks. It may indeed be necessary to cope with an absence of continuity in one of the cables without however breaking the connection. This may be necessary, for example, when the cable is too lengthy, the information sources are far too mobile, or else when there is an obstacle that does not allow the cable to pass through and cannot be modified or pierced.

2. PRIOR ART

A basic approach to the extension or replacing of a link comprising two sending channels (from a first node to a second node) could consist in implementing a wireless connection using two pairs (sender, receiver) each transmitting on one sending channel. Thus, such an approach would use:
two wireless senders integrated into the first node or connected to the end of the first link portion, itself connected to the first node and co-operating with
two wireless receivers integrated into the second node or connected to the end of a second link portion, itself connected to the second node.

For a link furthermore comprising two reception channels (from the second node to the first node), the above-mentioned basic approach could be supplemented by implementing a wireless connection that uses two other pairs (sender, receiver) each transmitting on a reception channel.

It is important to note that, according to this basic approach, each sending channel or reception channel requires a pair (sender, receiver). This approach is therefore costly.

It will furthermore be noted that radio devices (senders or receivers) in existence today are capable of supporting the information transfer protocols generally used in communications networks (for example IEEE 1394 compliant protocols, Ethernet type protocols or again proprietary protocols).

It must also be noted that the links generally have two modes: a connection set-up mode and a normal transmission mode. The data transmission mode is compatible with transmission in transposed band. By contrast, the connection set-up mode comprises a synchronization sequence which, by nature, is incompatible with transmission in transposed band. This is because the signal conveying this synchronization sequence does not have the right spectral characteristics.

3. GOALS OF THE INVENTION

It is a goal of the invention especially to overcome these different drawbacks of the prior art.

More specifically, one of the goals of the present invention, in at least one embodiment, is to provide a technique to extend or replace a link contained in a communications network, this technique being less costly than the basic solution mentioned here above.

It is also a goal of the invention, in at least one embodiment, to provide a technique of this kind that necessitates no modification of the existing infrastructure of the communications network in which the technique of the invention is implemented.

Another goal of the invention, in at least one embodiment, is to provide a technique of this kind that enables compliance with the particular features of the link to be extended or replaced (for example the connection set-up mode and the normal transmission mode).

4. ESSENTIAL CHARACTERISTICS OF THE INVENTION

These different goals, as well as others that shall appear here below are achieved according to the invention by means of a device for the modulation of at least one carrier frequency, of the type comprising, for each carrier frequency, one phase modulation arm, one quadrature modulation arm and means for combining signals generated on the modulation arms in phase and in quadrature so as to obtain a modulated carrier frequency, said device comprising, for each carrier frequency:

- means of discrimination between a signal coming from a first channel of a communications link and a signal coming from a second channel of said link, so as to obtain differentiated first and second signals;
- first assigning means, enabling the assigning of the first differentiated signal to one of the two modulation arms, and the second differentiated signal to the other of the two modulation arms.

According to the general principle of the invention therefore, in order to extend or replace a link by a wireless connection, the two modulation arms (in phase and in quadrature respectively) of a same modulator (modulation device) are used to transmit the first and second channels of this link. The invention is therefore less costly because, unlike the above-mentioned basic solution (see above discussion of the prior art), it enables transmission on two channels with only one modulator.

The invention also provides for discrimination between the signals coming from the two channels of the link, so that it is two differentiated signals that are assigned to and processed by the two modulation arms. As described in greater detail here below, this enables a demodulator (a demodulation device) according to the invention, with which the modulator according to the invention co-operates, to determine, between two signals that it receives on its two demodulation arms:

- which is the received signal that corresponds to the first differentiated signal, and must therefore be assigned to the first channel of the link, and
- which is the received signal that corresponds to the second differentiated signal, and must therefore be assigned to the second channel of the link.

It will be noted that if the first and second differentiated signals are arbitrarily assigned to the phase and quadrature modulation arms respectively (or vice versa), then the discrimination performed at sending enables the demodulator to recover not only the correspondence between the two signals received and the first and second differentiated signals, but also the correspondence between the signals generated on the phase and quadrature modulation arms (signal in phase and quadrature) and the signals received on the two demodulation arms. In other words, the discrimination made at sending removes doubts about the question of knowing which demodulation arm has received the phase signal and which demodulation arm has received the quadrature signal. Indeed, it is well known that during a band transposition using modulation with highly spectral efficiency, there is a problem of loss of consistency of information.

Furthermore, the bandwidth of the wireless connection implemented according to the invention is of course chosen so as to be compatible with the bit rates used in the communications network (for example bit rates greater than 100 Mbps, in the case of a home audiovisual network).

Preferably, said discrimination means include means for the insertion of at least one predetermined discrimination sequence in at least one of the signals coming from the first and second channels, each discrimination sequence being specific to the channel from which comes the signal in which said discrimination sequence is inserted.

Preferably, said discrimination means furthermore comprise first detection means, enabling the detection of a predetermined source sequence in at least one of the signals coming from the first and second channels. Furthermore, said insertion means enable the replacement of the predetermined source sequence, in each signal in which the predetermined sequence has been detected, by a discrimination sequence specific to the channel from which there comes the signal in which said discrimination sequence is inserted.

Preferably, said source sequence is a first synchronization sequence.

Thus, the synchronization sequence of the link is used as an element activating the discrimination between the signals coming from the first and second channels. This is especially valuable when the synchronization sequence of the link is not adapted to wireless transmission and must therefore imperatively be replaced by a sequence adapted to wireless transmission, if the synchronization has to be propagated despite wireless transmission between the modulator and the demodulator.

According to an advantageous characteristic, each discrimination sequence is a second synchronization sequence adapted to wireless transmission.

Advantageously, each discrimination sequence is a Barker sequence.

In an advantageous embodiment of the invention, said insertion means enable the insertion of:

- a first discrimination sequence, which is a Barker sequence of positive polarity, in the signal coming from the first channel, and
- a second discrimination sequence, which is a Barker sequence of negative polarity, in the signal coming from the first channel, or vice versa.

Advantageously, the modulation device modulates at least two carrier frequencies and generates at least two modulated carrier frequencies. Furthermore, the frequency spectra occupied by said at least two modulated carrier frequencies are separated.

Thus, interferences between the modulated carrier frequencies are avoided.

According to one advantageous variant, the modulation device modulates at least two carrier frequencies and generates at least two modulated carrier frequencies. Furthermore, said at least two carrier frequencies comprise a fundamental carrier frequency for which each other carrier frequency is a multiple.

In other words, mutually orthogonal carrier frequencies are used, enabling the prevention of interference between the modulated carrier frequencies.

Advantageously, said communications link belongs to the group comprising:

- first links each interconnecting a multimedia interface device and a switching device;
- second links each interconnecting two switching devices to each other.

This first application of the invention has already been discussed here above (the extension or replacement of the link of a communications network as described in the French patent application FR0300833). It is clear however that many other applications of the invention can be envisaged, especially the above-mentioned second application (the extension or replacement of an inter-node link, when each node integrates multimedia interface means and switching means).

In a particular embodiment, the modulation device is integrated into a node included in a communications network, and said communications link is a link internal to said node.

Advantageously, said first channel is dedicated to the sending of segments comprising most significant bits of information bytes sent by a sending device, and said second channel is dedicated to the sending of segments comprising least significant bits of information bytes sent by said sending device.

The invention also relates to a sender, comprising:
a modulation device according to the invention;
wireless sending devices enabling the sending, directly or after frequency transposition, of each modulated carrier frequency generated by said modulation device.

In a first particular embodiment, the wireless sending means comprise the following for each modulated carrier frequency:
first frequency transposition means, receiving said modulator carrier frequency and generating a final modulated carrier frequency;
at least one first electrode, placed on a first side of an electrically non-conductive partition wall and activated by said final modulated carrier frequency, said at least one first electrode being designed to co-operate with at least one second electrode included in a receiver and placed on a second side of said partition wall, facing said at least one first electrode, so that said receiver receives said finally modulated carrier frequency.

It will be noted that certain or all the modulated carrier frequencies can share same first frequency transposition means and/or at least one same first electrode.

In a second particular embodiment, the wireless sending means comprise, for each modulated carrier frequency:
first frequency transposition means, receiving said modulator carrier frequency and generating a final modulated carrier frequency;
a first antenna activated by said final modulated carrier frequency.

It will be noted that certain or all the modulated carrier frequencies can share same first frequency transposition means and/or a same first antenna.

The invention also relates to a device for the demodulation of at least one modulated carrier frequency, of the type comprising, for each modulated carrier frequency, two demodulation arms out of phase by 90° relative to each other, each enabling the reception of a signal, said modulation device comprising, for each modulated carrier frequency:
means for the determining, among the two signals received by the two demodulation arms, of the signal corresponding to a first differentiated signal and the signal corresponding to a second differentiated signal, as a function of a discrimination made at sending;
second assigning means, enabling the received signal corresponding to the first differentiated signal to be assigned to a first channel of a communications link, and the received signal corresponding to the second differentiated signal to be assigned to a second channel of said link. Preferably, the determining means comprise:
second detection means enabling the detection of a discrimination sequence in at least one of the signals received by the two demodulation arms;
decision means to decide, as a function of each discrimination sequence detected, which of the two received signals corresponds to the first differentiated signal and which one corresponds to the second differentiated signal.

Preferably, in the determining means:
the second detection means enable the detection of a first discrimination sequence in any one of the two signals received on the demodulation arms, and of a second discrimination sequence, distinct from the first discrimination sequence, in any one of the two signals received on the other of the two demodulation arms;
the decision means decide that the received signal which corresponds to the first differentiated signal is the one in which the first discrimination sequence has been detected, and that the received signal, which corresponds to the second differentiated signal, is the one in which the second discrimination sequence has been detected.

Furthermore, the decision means take a decision only if the second detection means simultaneously detect the first and second discrimination sequences in the two signals received on the demodulation arms.

Advantageously, the determining means furthermore comprise means for the replacing, in each received signal in which a discrimination sequence has been detected, of said discrimination sequence by a source sequence.

Thus, to the first and second channels of the link connected to the demodulator, there are assigned signals that are identical (barring transmission errors between the modulator and the demodulator) to the signals coming from the first and second channels of the link connected to the demodulator.

According to an advantageous characteristic, said source sequence is a third synchronization sequence.

Thus, a link synchronization sequence is presented initially at the first and second channels of the link connected to the modulator, then following a first replacement it gets propagated between the modulator and the demodulator in the form of at least one discrimination sequence and finally, following a second replacement, it is recovered, in its initial form of a link synchronization sequence, on the first and second channels of the link connected to the modulator.

Advantageously, each discrimination sequence is a fourth synchronization sequence adapted to wireless transmission.

In an advantageous embodiment of the invention, each discrimination sequence is a Barker sequence.

Preferably, the first discrimination sequence is a Barker sequence of positive polarity, and the second discrimination sequence is a Barker sequence of negative polarity or vice versa.

Advantageously, said communications link belongs to the group comprising:
first links each interconnecting a multimedia interface device and a switching device;
second links each interconnecting two switching devices to each other.

In a particular embodiment of the invention, the demodulation device is integrated into a node included in a communications network, and said communications link is a link internal to said node.

In a particular embodiment, said first channel is dedicated to the sending of segments comprising most significant bits of information bytes sent by a sender device, and said second channel is dedicated to the sending of segments comprising least significant bits of information bytes sent by said sender device.

The invention also relates to a receiver comprising:
wireless reception means, enabling the reception of at least one modulated carrier frequency, or at least one final modulated carrier frequency resulting from a frequency transposition of at least one modulated carrier frequency;

a demodulation device according to the invention.

In a first particular embodiment, the wireless reception means comprise, for each final modulated carrier frequency:

at least one second electrode placed on a second side of a partition wall that is electrically non-conductive, facing at least one first electrode included in a sender and activated by said final modulated carrier frequency, so that said at least one second electrode enables the reception of said final modulated carrier frequency;

second frequency transposition means enabling the recovery of said modulated carrier frequency from said final modulated carrier frequency.

It will be noted that certain or all the final modulated carrier frequencies may share at least one same second electrode and/or same second frequency transposition means.

In a second particular embodiment, for each modulated carrier frequency, the wireless reception means comprise:

a second antenna enabling the reception of said final modulated carrier frequency;

second frequency transposition means, enabling the recovery of said modulated carrier frequency from said final modulated carrier frequency.

It will be noted that certain or all the final modulated carrier frequencies can share a same second antenna and/or same second frequency transposition means.

The invention also relates to a method for the modulation of at least one carrier frequency comprising, for each carrier frequency:

a step of discriminating between a signal coming from a first channel of a communications link and a signal coming from a second channel of said link, so as to obtain first and second differentiated signals;

a first assigning step, enabling the assigning of the first differentiated signal to one of the two modulation arms of the modulation device, and the second differentiated signal to the other of the two modulation arms of said modulation device, said modulation device comprising means for the combination of the signals generated at the phase and quadrature modulation arms so as to obtain a modulated carrier frequency.

The invention also relates to a sending method comprising:

a step of modulation according to the method of modulation according to the invention;

a wireless sending step enabling the sending, directly or after frequency transposition, of each modulated carrier frequency generated by said modulation device.

The invention also relates to a method for the demodulation of at least one modulated carrier frequency comprising, for each modulated carrier frequency:

a step for the determining, among the two signals received by two demodulation arms of the demodulation device out of phase by 90° relative to each other, of the received signal corresponding to a first differentiated signal and of the received signal corresponding to a second differentiated signal, as a function of a discrimination made at sending;

a second assigning step enabling the assigning of the received signal corresponding to the first differentiated signal to a first channel of a communications link, and the received signal corresponding to the second differentiated signal to a second channel of said link.

The invention also relates to a reception method comprising:

a wireless reception step, enabling the reception of at least one modulated carrier frequency, or at least one final modulated carrier frequency resulting from a frequency transposition of at least one modulated carrier frequency;

a step of demodulation according to the modulation method of the invention.

5. LIST OF FIGURES

Other particular features and advantages of the invention shall appear from the following description of a preferred embodiment of the invention, given by way of an indicative, non-exhaustive example, and from the appended drawings of which:

6. DESCRIPTION OF AN EMBODIMENT OF THE INVENTION

Figure 1A:
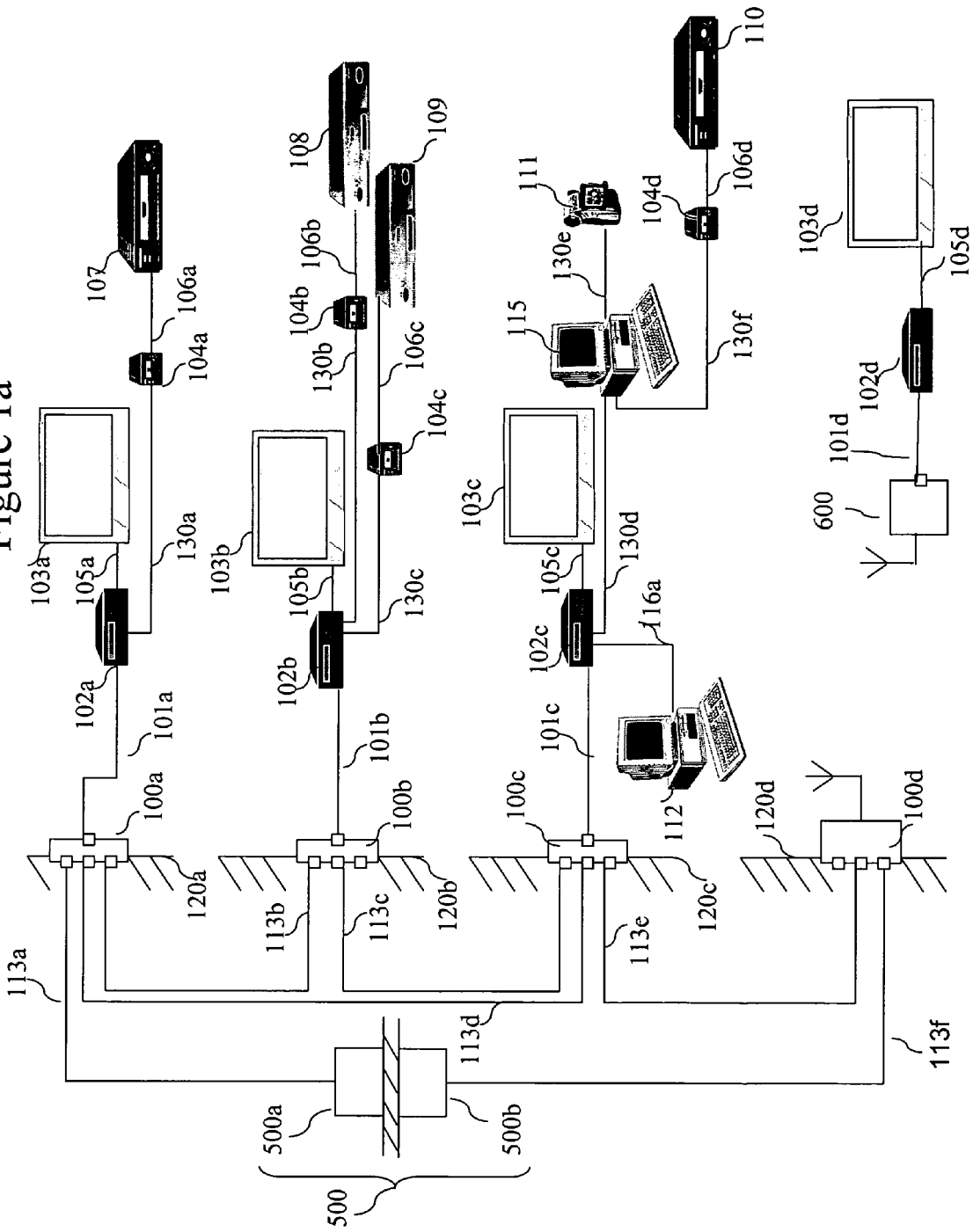
FIG. 1a shows a first example of a communications network implementing a first particular embodiment and a second particular embodiment of the link-extending or link-replacing system according to the invention (described in detail in FIGS. 5 and 6 respectively)

Referring now to FIG. 1a, a first example is given of the communications network implementing two particular embodiments (described in detail in FIGS. 5 and 6 respectively) of the link-extending or link-replacing system according to the invention.

This is a communications network essentially as described in the French patent application FR0300833 filed on 24 Jan.

2003. However, it furthermore comprises two link-extending or link-replacing systems according to the invention.

This communications network links up television sets (103a,103b,103c,103d) with video-cassette recorders 107 and 110 and DVD readers 108 and 109, and computers 115 and 112. These computers may also have, for example, a digital movie or television camera referenced 111 connected to them.

This network has multimedia interface devices referenced 102a, 102b, 102c and 102d.

Each multimedia interface device is placed in the vicinity of information sources and comprises means to mix this information, so as to be able to transmit it through a single medium. Each multimedia interface device supports a first protocol adapted to the transfer of multimedia information by isochronous or asynchronous type data packets (for example of the IEEE1394 compliant type), and a second protocol adapted to the transfer of information by means of Ethernet or proprietary type packets.

More specifically, the mixing means comprises means for the reservation of bandwidth in the communications network. These bandwidth reservation means ensure a minimum bandwidth for isochronous type multimedia information, and a maximum bandwidth for asynchronous type multimedia information.

The multimedia interface devices 102a is connected to a switching device 100a through a unique transmission medium (also called a link or connection), for example a CAT5 type cable 101a. The switching devices are connected to one another in the same way.

This same switching device 100a is connected to other switching device referenced 100b, 100c and 100d.

The switching device 100a is connected to the switching device 100d by means of two cables 113a, 113f (that can be perceived as being two portions of the same cable which it is sought to extend) themselves connected by means of a link extending system according to the invention 500 (in a particular form described here below with reference to FIG. 5). It is assumed here that there is an insurmountable obstacle of a non-conductive nature (for example a wall) between the switching devices 100a and 100d.

The switching device 100a is also connected by means of another cable 113d to the switching device 100c, which is itself connected by another cable 113e to the switching device 100d. The switching device 100c is connected to the switching device 100b by means of a cable 113c and finally the switching device 100b is connected to the switching device 100a by means of a communications link 113b.

The multimedia interface device 102a is connected by means of an analog video connection or link 105a to the television set 103a. The multimedia interface device 102a is also connected by means of an IEEE 1394 compliant connection to an analog-digital converter 104a itself connected to a video-cassette recorder 107 by means of a connection 106a.

The multimedia interface devices 102a, 102b, and 102c are respectively connected to the switching devices 100a, 100b, and 100c by means of transmission media (also called links or connections) which are a particular embodiment of the CAT5 type cables 101a, 101b, 101c and 101d. This type of cable is classically used in Ethernet type networks.

In the present context, each CAT5 type cable is formed by four pairs of twisted wires: two pairs dedicated to the sending of information and two pairs dedicated to the reception of information. In each set of two transmission pairs (dedicated to sending or to reception), one pair transmits segments comprising most significant bits of the information bytes sent by the sending devices and the other pair transmit segments comprising least significant bits of the information bytes sent by the sending devices.

It must be noted that other media could be used such as fiber-optic links or cables compliant with the IEEE1355 standard.

The CAT5 type cables 101a, 101b and 101c are particularly well suited to the invention because they are already widely used and are reasonably priced.

The analog television sets 103b, 103c and 103d are respectively connected to the multimedia interface devices 102b, 102c and 102d respectively by connections 105b, 105c and 105d in a manner identical to that of the connection 105a connecting the envelope television set 103a and the multimedia interface device 102a.

The multimedia interface device 102b is connected by an IEEE 1394 type connection referenced 130b to an analog digital converter 104b that will convert the analog video information generated by the DVD reader 108 into a format compatible with the IEEE 1394 standard. The DVD reader 108 is connected to the digital analog converter 104b by an analog connection 106b comprising RCA type connectors.

The multimedia interface device 102b is connected by a second connection 130c identical to the connection 130b to an analog-digital converter 104c identical to the converter 104b which is itself connected to a DVD reader 109 by means of a connection 106c. Since the connections are identical to those described here above, they shall not be explained in greater detail. It must be noted that any type of analog information generator may be connected to the analog-digital converter 104c, for example a movie or television camera or a microphone.

The multimedia interface device 102c is connected by means of an Ethernet type connection 116a with a computer 112.

The multimedia interface device 102c has a second computer 115 connected to it by an IEEE 1394 type connection referenced 130d. This computer 115 also has a digital camcorder 111 connected to it by means of an IEEE 1394 type connection referenced 130e and an analog video-cassette recorder 110 connected to it by means of an analog digital converter 104d identical to the converter 104c described here above. Since the connection 130f is identical to the connection 130c, it shall not be described. This is also the case for the connection 106d with the connection 106b.

It must be noted that each of the multimedia interface devices described here above comprises at least Ethernet, IEEE1394 type connection means and at least one analog video output. All the information obtained or delivered by this connection means will be distributed to other remote multimedia interface devices by means of a single CAT5 type cables. This cable will greatly simplify the installation of such a network in a home environment. Indeed, only one cable 101a will be necessary to connect the multimedia interface device 102a to the wall socket 100a. This is also the case for the cables 101b and 101c.

The switching devices (made for example in the form of wall sockets) 100a, 100b, 100c and 100d include communications means and several input/output ports that are interconnected by means of multiples connections enabling efficient routing of the data. Since these multiples connections are integrated into the infrastructure of the home, they are not troublesome to the user of such a network.

The switching device 100d is not wired to the multimedia interface device 102d, that is connected to this device by means of a link-extending system according to the invention, comprising firstly a first sending/reception assembly integrated into the switching device 100 and secondly a second sending/reception assembly 600 connected by a short cable 101d to the multimedia interface device 102d. Each sending/reception assembly is, for example, made in a particular form described here below with reference to FIG. 6.

This example of a network also has a connection-setting phase and an information-transmission phase as its characteristics. The connection-setting phase is characterized by a frame different from the information-transportation or carrying frame.

In the information-transmission phase, information-transportation frames are transmitted. And information-transportation frame contains a synchronization header followed by field of data, all scrambled and encoded. Indeed, to comply with an absence of a direct current component on the cables, the transmitted signals must be scrambled, to prevent the appearance of periods, and they must be encoded, to ensure balance between the number of positive voltage signals and the number of negative voltage signals. When there is no information to be transmitted, the sender sends a sequence of "one" bits, all scrambled and encoded.

In the connection set-up phase, the sequence of non-encoded and non-scrambled bits is transmitted. This sequence contains a synchronization signal followed by the initialization of the scrambler in order to enable the de-scrambler located on the receiver side to start working in the right state.

When a transmission error occurs, the links immediately return to the connection set-up mode.

Figure 1B:
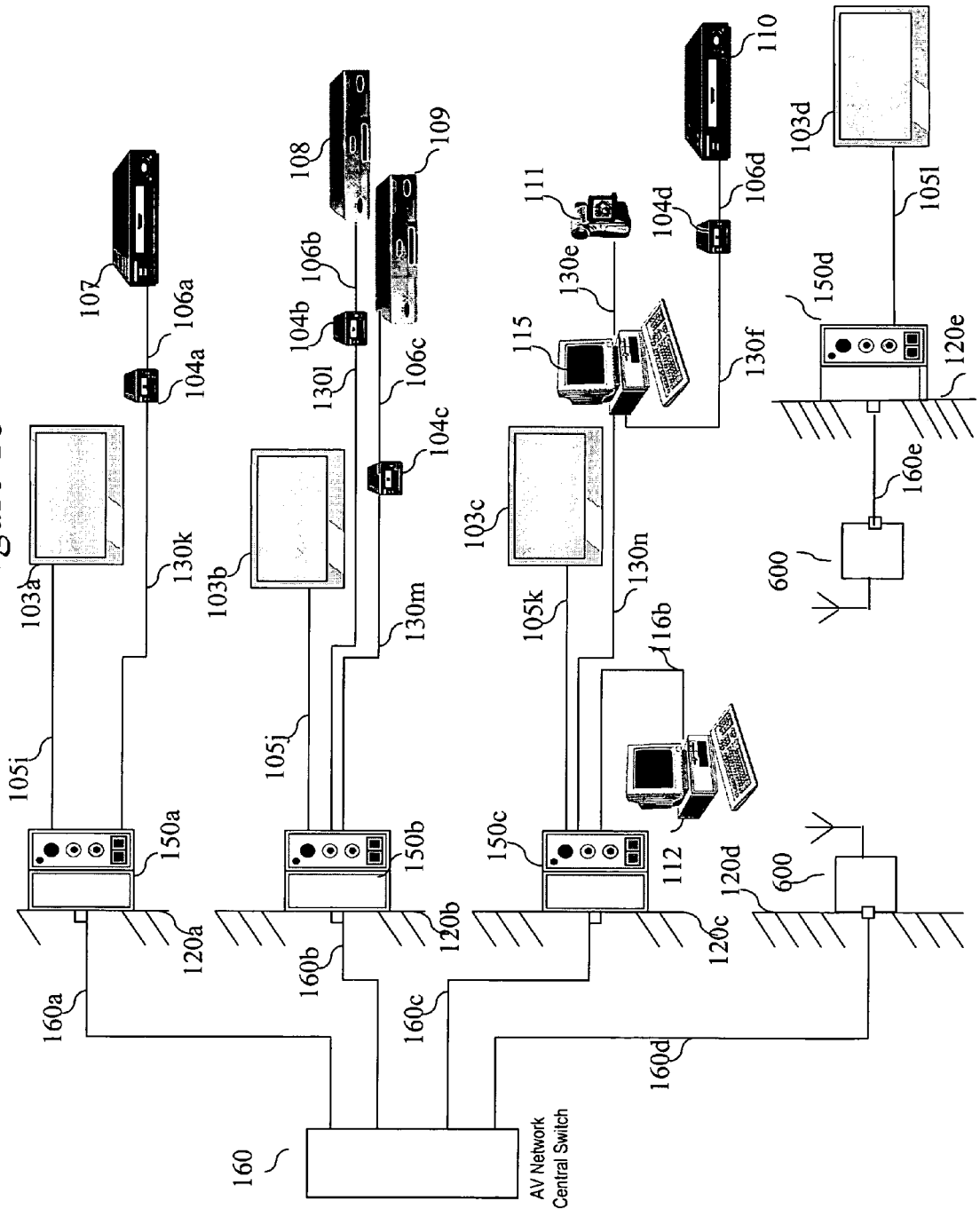
FIG. 1b shows a second example of a communications network implementing a second particular embodiment of the link-extending or link-replacing system according to the invention (described in detail in FIG. 6)

Referring now to FIG. 1b, we present a second example of a communications network implementing a particular embodiment (described in detail in FIG. 6) of the link-extension or link-replacement system according to the invention.

The elements common to FIGS. 1a and 1b retain the same numerical references unless otherwise indicated here below.

The multimedia interface devices referenced 102a, 102b and 102c in FIG. 1a are referenced 150a, 150b and 150c in FIG. 1b. They are integrated into the partition walls, 120b and 120c respectively, of the main dwelling.

The multimedia interface device referenced 102d in FIG. 1a, and referenced 150d in FIG. 1b, is not integrated into a partition wall 120e of the main dwelling but into a partition wall distant from the main dwelling (for example an outhouse).

The switching devices referenced 100a, 100b, 100c and 100d in FIG. 1a for their part are grouped together in a central switchboard 160 preferably placed beside the electrical power supply panel. This configuration brings many advantages: indeed a single medium or more specifically a single cable, respectively 160a, 160b, 160c and 160d, will connect the different parts of the house to the central switching unit 160. This will simplify the installation of the network and also reduce its cost.

The cable 160d (on the main dwelling side) is connected to the multimedia interface device 150d (on the outhouse side) by means of a link-extension system according to the invention, comprising firstly a first sending/reception set 600 integrated into a partition wall 120d of the main dwelling and secondly a second sending/reception set 600 connected by a short cable 160e to the multimedia interface device 150d. Each sending/reception set is made for example in a particular form described here below with reference to FIG. 6.

The interconnections (links) referenced 113a, 113b, 113c, 113d and 113e in FIG. 1 are made in the central switchboard 160. For the sake of simplicity, they are not shown herein.

The connections 105i, 105j, 105k and 105l are identical to the connections 105a, 105b, 105c and 105d of FIG. 1a. They shall not be described in greater detail.

The connections 130k, 130l, 130m and 130n are identical to the connections 130a, 130b, 130c and 130d of FIG. 1a. They shall not be described in greater detail.

The connection 116b is identical to the connection 116a of FIG. 1a. It shall not be described in greater detail.

The devices such as television sets, video-cassette recorders, digital analog converters, DVD readers, camcorders and microcomputers as well as associated connections are identical to those described with reference to FIG. 1a. They shall not be further described.

Figure 2:
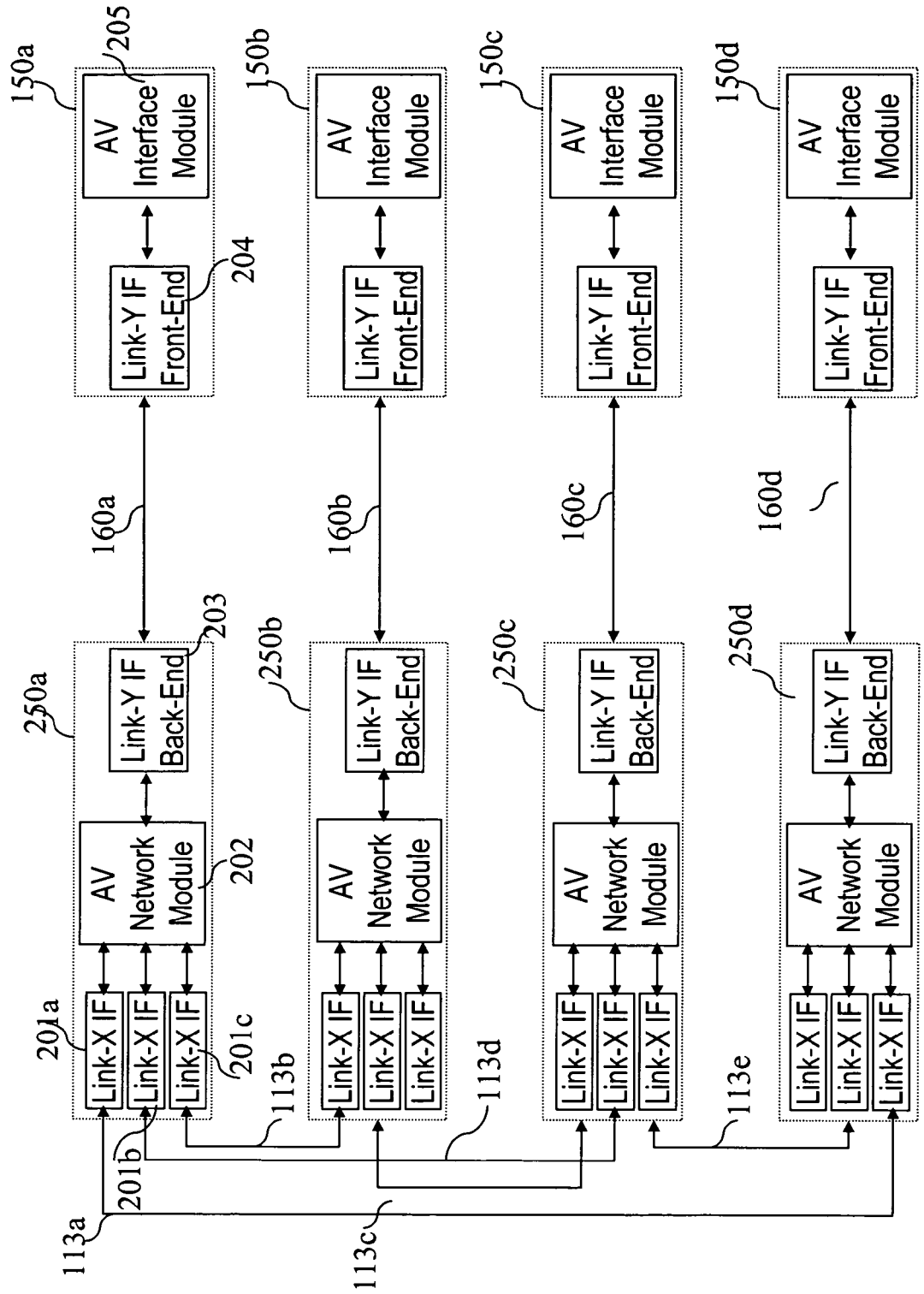
FIG. 2 is a block diagram of a particular embodiment, that is known, of the interface devices and switching devices included in the networks of FIGS. 1a and 1b.

FIG. 2 is a block diagram of a particular, prior art embodiment of the interface devices and of the switching devices included in the networks of FIGS. 1a and 1b. It may be recalled that these devices are described in detail in the French patent application FR0300833 filed on 24 Jan. 2003.

The four independent switching devices referenced 100a, 100b, 100c and 100d in FIG. 1a, or else grouped together in the central switchboard referenced 160 in FIG. 1b, are referenced 250a, 250b, 250c and 250d in FIG. 2.

They are interconnected by connections (links) referenced 113a, 113b, 113c, 113d and 113e.

The switching device 250a comprises:
  a first interface module 203, called a "Y link interface module". A Y link connects a multimedia interface device with the switching device;
  a second module 202 which is an audio-video network module;
  interface modules 201a, 201b and 201c, known as "X link interface modules". An X link connects a switching device with a switching device.

It must be noted that the modules of 201a, 201b and 201c are similar to the module 203. It must also be noted that since the links 113a, 113b, 113c, 113d and 113e have a length appreciably smaller than that of the links 160a, 160b, 160c and 160d (see here below), transmission bit rates on the links 113a, b, c, d and e could be greater (but not necessarily so) than the bit rates that can be envisaged on the links 160a, 160b, 160c and 160d which are in the range of 100 Mbps. In a minimum-cost construction, the same device will be chosen for a Y link and an X link.

The switching devices 250b, 250c and 250d are identical to the device 250a. They shall not be described in greater detail.

The switching devices 250a, 250b, 250c and 250d have multimedia interface devices 150a, 150b, 150c and 150d (also referenced 102a, 102b, 102c and 102d in FIG. 1a) respectively connected to them through a single cable 160a, 160b, 160c and 160d.

The multimedia interface device 150a is constituted by two modules referenced 204 and 205. The interface module 204, known as a Y link interface module, is identical to the module 203. The interface module 205 is an audio-video interface module.

The link-extension or link-replacement systems according to the present invention are capable of replacing or extending any of the connections 113a,b,c,d or e (links between the switching devices) and connections 160a, b, c or d (links between switching devices and multimedia interface devices).

Figure 3:
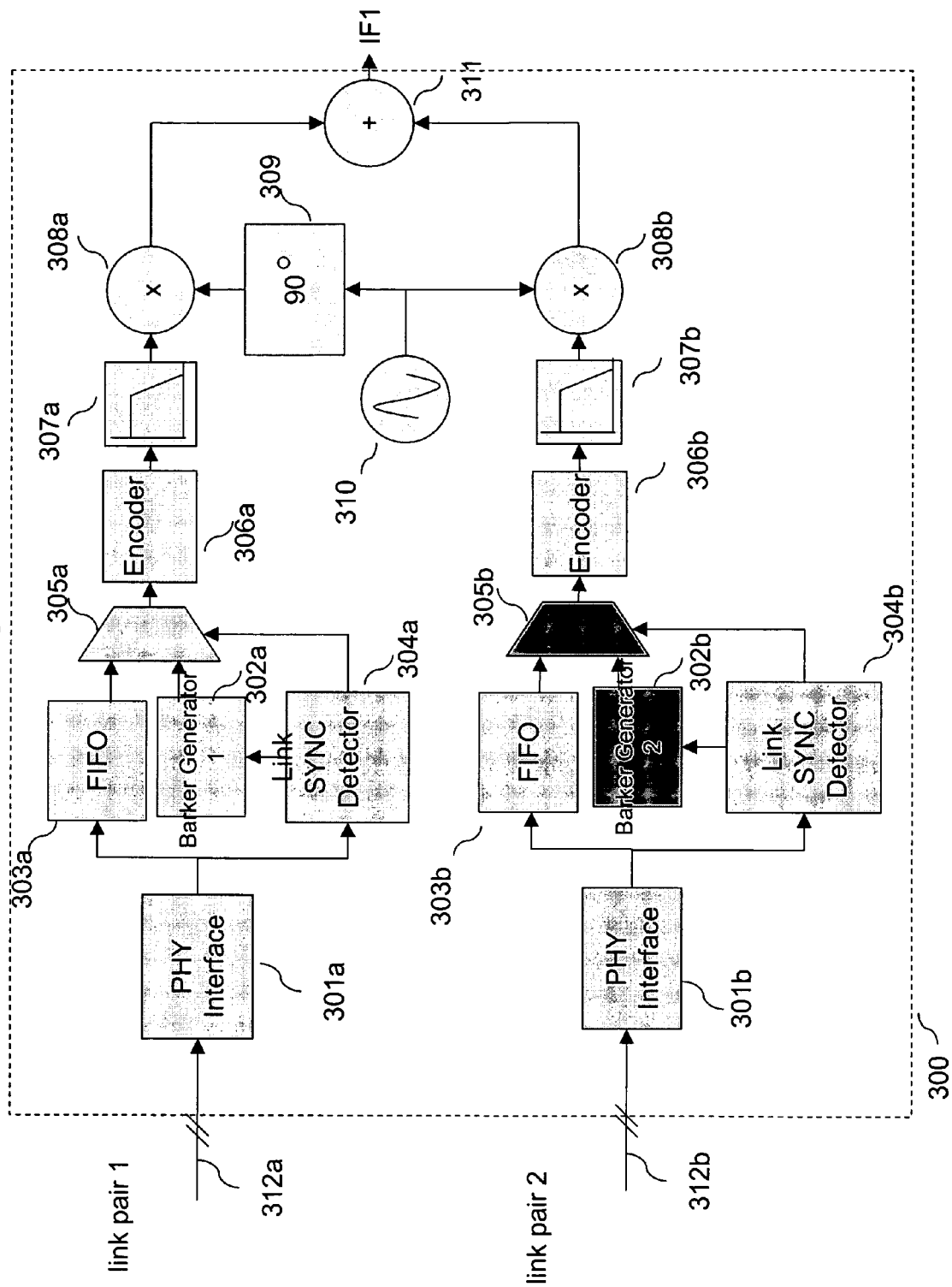
FIG. 3 is a block diagram of a particular embodiment of a modulator according to the invention, adapted to the communications networks shown in FIGS. 1a and 1b.

FIG. 3 is a block diagram of a particular embodiment of a modulator according to the invention, adapted to the communications networks shown in FIGS. 1a and 1b and contained in a link-extension or link-replacement system (two particular embodiments of which are shown here below with reference to FIGS. 5 and 6).

To be adapted to the multimedia communications network, the modulator 300 has two physical interfaces 301a and 301b, each receiving a distinct pair of wires 312a and 312b of a CAT5 cable, the two pairs being dedicated to the transmission of information. These two interfaces are identical to the ones described here above with reference to FIG. 2 ("X or Y link interface modules"). One of the physical interfaces 301a enables the extraction of the signal conveyed by the first pair 312a (namely the segments comprising the most significant bits of the information bytes) and its transmission to a first FIFO memory 303a, as well as to a first link synchronization detector 304a. The other one of the physical interfaces 301b enables the extraction of the signal conveyed by the second pair 312b (namely the segments comprising the least significant bits of the information bytes) and its transmission to a second FIFO memory 303b, as well as to a second link synchronization detector 304b.

The detectors 304a and 304b are for examples correlators. Those skilled in the art know that such detectors can easily be implemented in programmable logic circuits.

It may be recalled that to maintain an absence of a direct current component on the cables, the signals transmitted must be scrambled, to prevent the appearance of periods, and they must be encoded, to ensure balance between the number of positive voltage signals and the number of negative voltage signals. In the information transmission phase, the pieces of data are thus scrambled and encoded.

By contrast, the connection set-up phase uses, for example, a link synchronization sequence which is a particular signal formed by the holding at a constant level of the electrical signal during a defined period, namely an absence of scrambling and encoding on the link. This synchronization sequence does not meet the constraints of balance of the polarities, and is therefore not a signal acceptable for band transposition. It is therefore necessary to replace it by a discrimination sequence which meets the constraints of balancing of the polarities, and is therefore an acceptable signal for a band transposition.

To replace the synchronization sequence, the particular embodiment of the invention described here below uses a discrimination sequence that is different for each of the signals transported by the first and second pairs 312a, 312b. Each of the two differentiated signals obtained after this replacement is given to a distinct branch among the two modulation branches of the modulator (in phase and in quadrature respectively). Thus, a discrimination is made between the signals before assigning them to the two modulation branches. This enables a demodulator (see the description of FIG. 4 here below) to determine which signal, of the two signals that it receives at its two modulation branches, is the received signal that corresponds to the first differentiated signal, and must therefore be assigned to a first pair 413a, and which is the received signal that corresponds to the second differentiated signal, and must therefore be assigned to a second pair 413b.

In another embodiment of the invention, the discrimination sequence is inserted into at least one of the two signals, without replacement of any synchronization sequence. Indeed, certain signals do not possess such synchronization sequences.

For the general purpose of the invention, it must be noted that the two discrimination sequences (which are different on the two modulation arms) can be substituted for any predetermined sequence (or signal) received on the two pairs of wires 312a and 312b of the CAT5 cable. If this is a sequence distinct from the synchronization sequence, then the synchronization sequence can meet the constraints of balancing of the polarities, and can therefore be a signal acceptable for a band transposition.

When the first detector 304a has determined the presence of a link synchronization sequence, it will switch over a first multiplexer 305a to replace the delayed version of the link synchronization sequence which appears at the output of the first FIFO 303a memory by a first discrimination sequence which is a synchronization sequence adapted to wireless applications, for example a Barker sequence of positive polarity created by a first generator 302a. When the first detector 304a determines the end of the link synchronization sequence then, with an appropriate delay, it will re-switch over the multiplexer 305a to the datastream coming out of the first FIFO memory 303a. Thus, a synchronization sequence adapted to wireless transmission has been made to replace the link synchronization sequence that is conveyed by the first pair 312a (and is not, for its part, adapted to the wireless transmission).

Similarly, when the second detector 304b has determined the presence of a link synchronization sequence, it will switch over a second multiplexer 305b to replace the delayed version of the link synchronization sequence that appears at the output of the second FIFO memory 303b by a second discrimination sequence which is a synchronization sequence adapted to wireless transmission, for example a Barker sequence of negative polarity created by a second generator 302b. When the second detector 304b determines the end of the link synchronization sequence, then with an appropriate delay it will re-switch the second multiplexer 305b over to the datastream output from the second FIFO memory 303b. Thus, a synchronization sequence adapted to the wireless transmission has replaced the link synchronization which is conveyed by the second pair 312b (and, is not, for its part, adapted to wireless transmission).

It may be recalled that a Barker sequence is formed by a sequence of 11 symbols NRZ {1, 1, 1, −1, −1, −1, 1, −1, −1, 1, −1}. Those skilled in the art know that the generators of Barker sequences can easily take shape in programmable logic circuits.

According to one variant, the first generator 302a sends a Barker sequence of negative polarity while the second generator 302b sends a Barker sequence of positive polarity.

More generally, other types of first and second synchronization sequences adapted to wireless transmission (discrimination sequences) may be envisaged, provided that they are different from each other and both acceptable for band transposition.

The signal output from the first multiplexer 305a is processed by the quadrature modulation arm. It is therefore encoded by a first encoder 306a (to obtain a differential relationship between the states of the signal), filtered by a first filter 307a, and then multiplied by the signal coming from a phase shifter shifting the output signal of an intermediate frequency generator 310 by 90°.

The signal output from the second multiplexer 305b is processed by the phase modulation arm. It is therefore encoded by second encoder 306b, filtered by a second filter 307b, and then multiplied in a second multiplier 308b by the intermediate frequency created by the generator 310.

Finally, the signals coming from the two modulation arms are added by an adder 311 to form a modulated signal IF1.

This intermediate modulation structure, comprising two phase and quadrature modulation arms, enables for example the generation of a DQPSK (Differential Quadrature Phase Shift Keying)), p/4-DQPSK, TFM (Tamed Frequency Modulation), GSK (Gaussian Shift Keying), or similar signal. This structure is well known to those skilled in the art and is given here in concise and non-exhaustive form.

Figure 4:
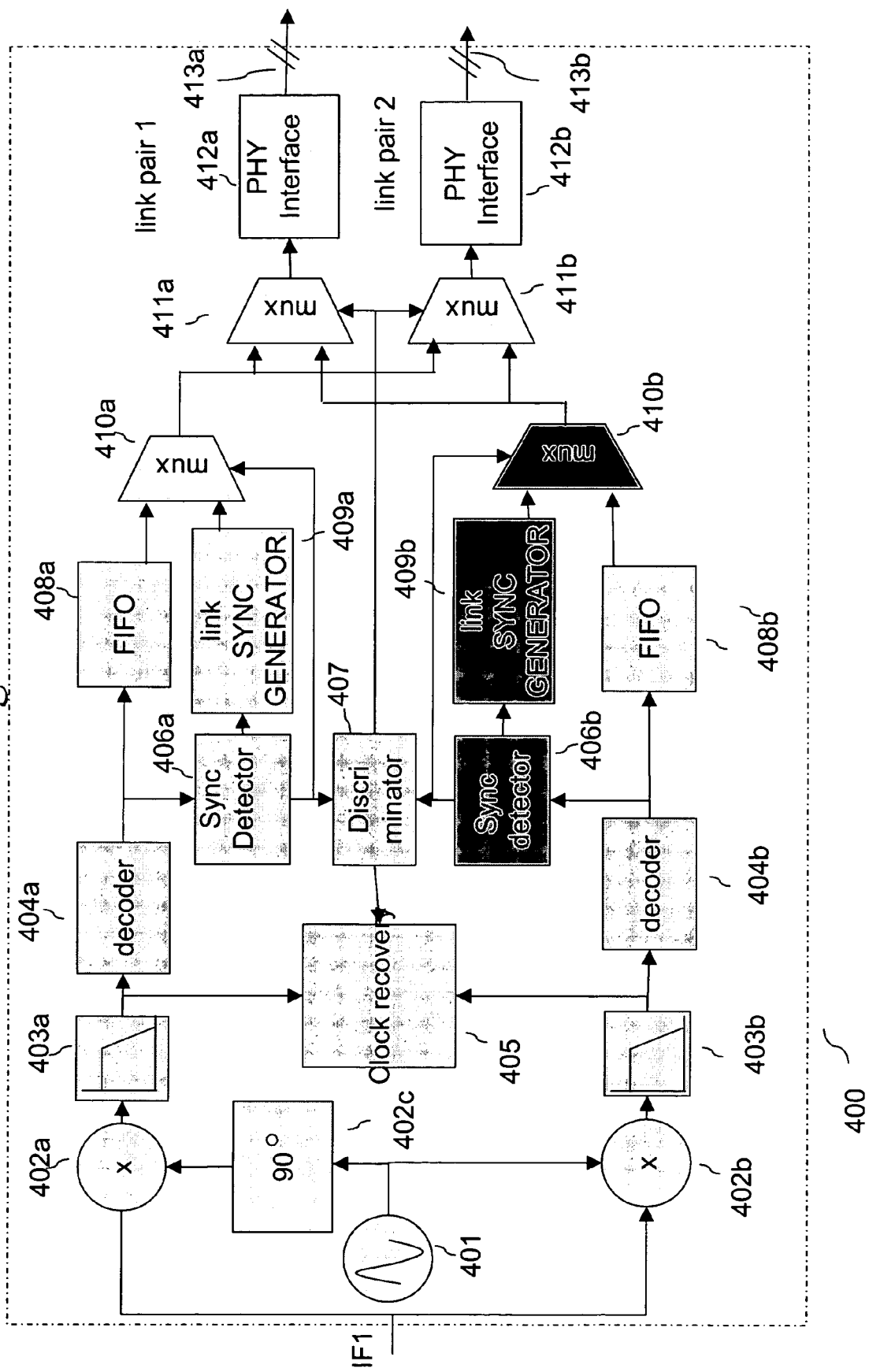
FIG. 4 is a block diagram of a particular embodiment of a demodulator according to the invention, adapted to the communications networks shown in FIGS. 1a and 1b.

FIG. 4 is a block diagram of a particular embodiment of a demodulator according to the invention, adapted to the communications networks shown in FIGS. 1a and 1b and included in a link-extension or link-replacement system according to the invention (of which two particular embodiments are described here below with reference to FIGS. 5 and 6). This demodulator integrates a synchronization sequence substitution function.

The demodulator has a classic structure comprising two demodulation arms.

In one arm, the received signal IF1 is demodulated in being multiplied (in a first multiplier 402a) by a carrier signal generated by a generator 401.

In the other arm, the received signal IF1 is demodulated in being multiplied (in a second multiplier 402) by a carrier signal shifted by 90° by a phase shifter 402c.

It may be noted that if a carrier signal is frequency-controlled, it is not position-controlled and hence, at this level, it is impossible to distinguish quadrature channel from the phase channel.

The signals obtained are then filtered by first and second filters 403a and 403b in order to be rid of parasitic images. Finally, a clock retrieval system 405 ensures the re-establishment of a sampling clock and enables the rest of the operations, namely the differential decoding in first and second decoders 404a and 404b, to be continued in digital mode.

At output of the first demodulation arms (the arm at the top of FIG. 4), the signal coming from the first decoder 404a is given firstly to a first FIFO memory 408a enabling the signal to be delayed by a phase and, secondly, to a first Barker sequence detector 406a.

At output of the second modulation arm (the arm at the bottom in FIG. 4), the signal coming from the second encoder 404b is given firstly to a second FIFO memory 408b used to delay the signal by another phase and secondly a second Barker sequence detector 406b.

It is assumed here that, upstream to each modulation arm, the modulator has substituted a radio synchronization sequence (adapted to wireless transmission) for a link synchronization sequence (not adapted to wireless transmission) and that this radio synchronization sequence is a Barker sequence of positive or negative polarity depending on the modulation arm (see the description of the demodulator of FIG. 3 here above).

Each of the detectors of the Barker sequence 406a and 406b is used to determine the presence of a Barker sequence. Each detector is in fact classically constituted by a digital correlator filter whose coefficients are the values of a Barker sequence (see the description of FIG. 7a here below). Depending on whether the polarity of the Barker sequence is positive or negative, each detector will give a positive or negative pulse, by which it will then be possible to determine which demodulation arm has received the phase signal and which demodulation arm has received the quadrature signal.

Each of the two detectors 406a and 406b transmits a piece of polarity information to a discriminator 407 which acts on first and second multiplexers 411a and 411b so that the signals coming from the demodulation arms are transmitted to the appropriate pairs of wires 413a and 413b of a CAT5 cable, by means of two physical interfaces 412a and 412b. These two interfaces (or ports) of the multimedia communications networks are identical to those described here above with reference to FIG. 2 ("X or Y link interface modules").

The discriminator 407 acts on the first and second multiplexers 411a and 411b only if the two detectors 406a and 406b have simultaneously detected the presence of Barker sequences. Indeed, a single detected sequence is an event related to a retransmission following a reception error, and not to the presence of a connection set-up sequence in this embodiment.

The first detector 406a acts on a first link synchronization sequence generator 409a. A third multiplexer 410a received firstly the signal output from the first FIFO memory 408a (placed at output of the first demodulation arms) and secondly the link synchronization sequence generated by the first generator 409a. The first detector 406a also acts on the third multiplier 410a to eliminate the Barker sequence (radio synchronization sequence) and replace it by the link synchronization sequence, on one of the inputs of each of the first and second multiplexers 411a and 411b discussed here above.

The second detector 406b acts on a second link synchronization sequence generator 409b. A fourth multiplexer 410b receives firstly the signal output from the second FIFO memory 408b (placed at output of the second demodulation arms) and, secondly, the link synchronization sequence generated by the second generator 409b. The second detector 406b also acts on the fourth multiplexer 410b to eliminate the Barker sequence (radio synchronization sequence) and replace it by the link synchronization sequence, on the other one of the inputs of each of the first and second multiplexers 411a and 411b discussed here above.

Figure 5:
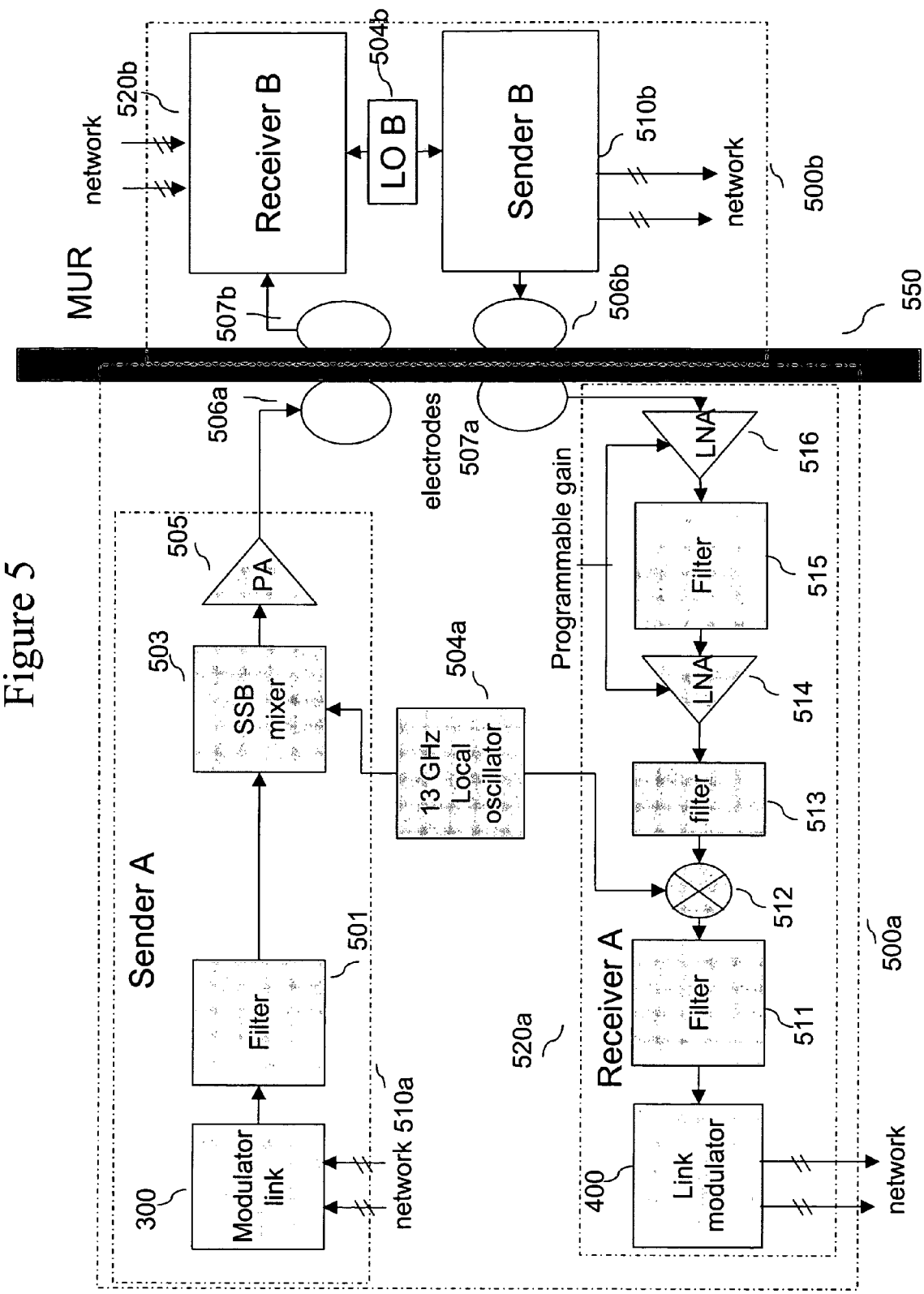
FIG. 5 is a block diagram of a first particular embodiment of a system according to the invention for the extension or replacement of a link (transmission by capacitive effect), adapted to the communications networks shown in FIGS. 1a and 1b.

FIG. 5 is a block diagram of a first particular embodiment of a link-extension or link-replacement system according to the invention (transmission by capacitive effect), adapted to the communications networks shown in FIGS. 1a and 1b.

In this first embodiment, a system of transmission by capacitive effect, as described for example in the patent application published under U.S. Pat. No. 2,827,721, is adapted to a multimedia communications network as described here above with reference to FIGS. 1a and 1b.

The system has a first sending/reception set 500a (comprising a sender A 510a and a receiver A 520a) that co-operates with a second sending/reception set 500b (comprising a sender B 510b and a receiver B 520b), through a insurmountable obstacle of a non-conductive nature (for example a partition wall) 550.

In the sending part of the first sending/reception set 500a, the sender A 510a comprises a modulator 300 as described here above with reference to FIG. 3, i.e. capable of receiving two pairs of wires of a CAT5 cable and generating an intermediate frequency modulated signal (see above detailed description of FIG. 3 here above). This modulated signal is filtered (by a filter 501), then mixed (by means of a single sideband mixer 503) with the signals coming from a 13 GHz local oscillator 504a. The output of the mixer 503 is fed into a power amplifier PA 505 which activates (at least) one first electrode 506a.

In the reception part of the first sending/reception set 500a, the signal received on (at least) one second electrode 507a is amplified by a programmable-gain low noise amplifier (LNA) 516, then filtered by a first filter 515, then re-amplified by a second LNA 514. A second filter 513 further cleans the signal before it is demodulated on a multiplier 512 by the 13 GHz signal coming from the local oscillator 504a. The signal is then filtered by a third filter 511, then this signal (intermediate frequency modulated signal IF1) enters the demodulator 400 as described with reference to FIG. 4.

On the other side of the partition 550, in the reception part of the second sending/reception set 500b, the system has (at least) one third electrode 507b placed against the partition wall and facing the first electrode 506a, as well as the receiver B 520b. This receiver is identical to the receiver A 520a described further above.

In the sending part of the second sending/reception said 500*b*, the system has (at least) one fourth electrode 506*b* placed against the partition wall and facing the second electrode 507*a*. It is activated by a sender B 510*b* that is identical in every point with the sender A 510*a* described further above.

It will be noted that the frequency of the generators 310 included in the modulators 300 of the senders A 510*a* and B 510*b* must be offset to ensure interference-free full duplex communication.

To make each sending/reception set, the invention uses for example a Hittite circuit HMC401QS for the local oscillator, HMC342 circuits for the low-noise amplifiers, HMC361S8G circuits for the attenuators, HMC143 for the mixers, the other components being made out of discrete elements.

Figure 6:
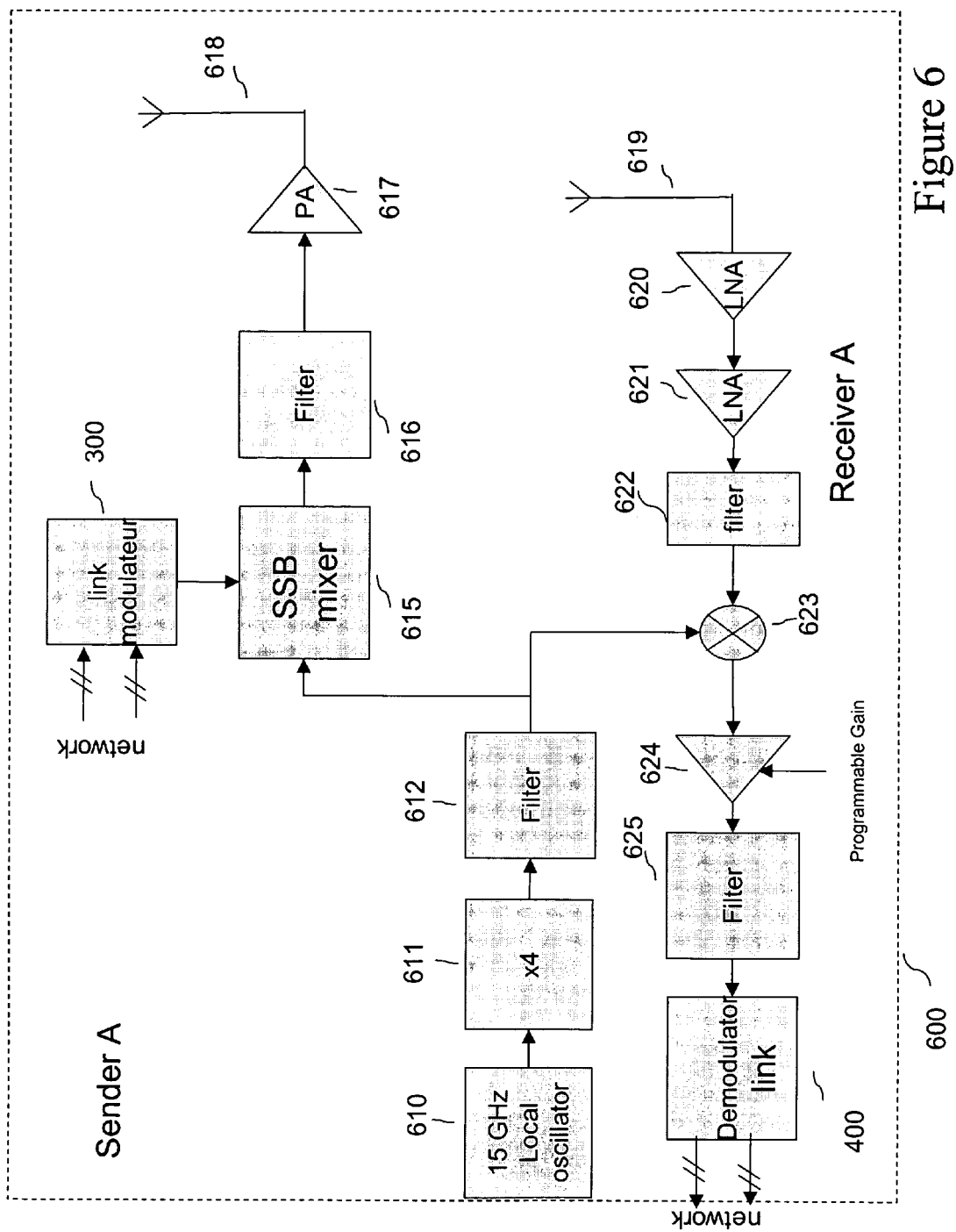
FIG. 6 is a block diagram of a second particular embodiment of a system according to the invention for the extension or replacement of a link ("long distance" transmission), adapted to the communications networks shown in FIGS. 1a and 1b.

FIG. 6 is a block diagram of the second particular embodiment of the link-extension or link-replacement system ("long-distance" transmission) of the invention adapted to the communications networks shown in FIGS. 1*a* and 1*b*.

In this second embodiment, the system is based on the co-operation of two sending/reception sets 600, also called wireless transmitters or transceivers, each comprising a sender A (itself comprising a modulator according to FIG. 3) and a receiver A (itself comprising a demodulator according to FIG. 4).

Reasonably long-range wireless transmitters can be made, by using for example a carrier frequency of 60 GHz, a frequency whose use is subjected to a few constraints in Japan and in the United States.

A detailed description shall now be given of the sending-reception set (wireless transmitter) 600. A local oscillator 610 gives a 15 GHz signal to a first multiplier 611. The output signal from the first multiplier is filtered by a first filter 612 and then sent on a single sideband mixer 615 and a second multiplier 623. The mixer 615 is used for the sending channel and the second multiplier 623 for the reception channel.

In the sending part, a modulator 300 according to FIG. 3 is connected to another output of the mixer 615. The output signal from the mixer 615 is filtered by a second filter 616, and then amplified by an amplifier PA 617 whose output is directly fed into a first antenna 618.

In the reception part, a second antenna 619 gives a signal to a low-noise amplifier 620, backed up by another amplifier 621. Then the signal is filtered by a third filter 622, before it is demodulated on the multiplier 623 by means of a 60 GHz carrier signal coming from the first filter 612. The intermediate frequency obtained is then amplified on a variable gain amplifier 624, then filtered by a fourth bandwidth filter 625 before entering a demodulator 400 according to FIG. 4.

It will be noted that the frequencies of the generators 310 included in the modulators 300 of the senders A of the two sender-receiver sets 600 must be offset to ensure interference-free full duplex transmission.

Several sources of components are available today for making these circuits.

The document by Kojei Fujii and A1, "A 60 Ghz MMIC chipset for 1-G-bit/s Wireless link", Agilent Technology, will provide information on commercially available circuits that can be used to make this transmitter. Depending on the power delivered to the antenna, connection distances of the order of several hundreds of meters can be obtained. Information on another source of components can be obtained from: "GaAs components for 60 GHz Wireless Communication Application, Velocium", presented on 11 Apr. 2002 at the GaAs Mantech Conference, San Diego, Calif. This document proposes circuits adapted to transmission at 60 GHz. The implementation of these circuits is described elsewhere and shall not be described again here.

Figure 7A:
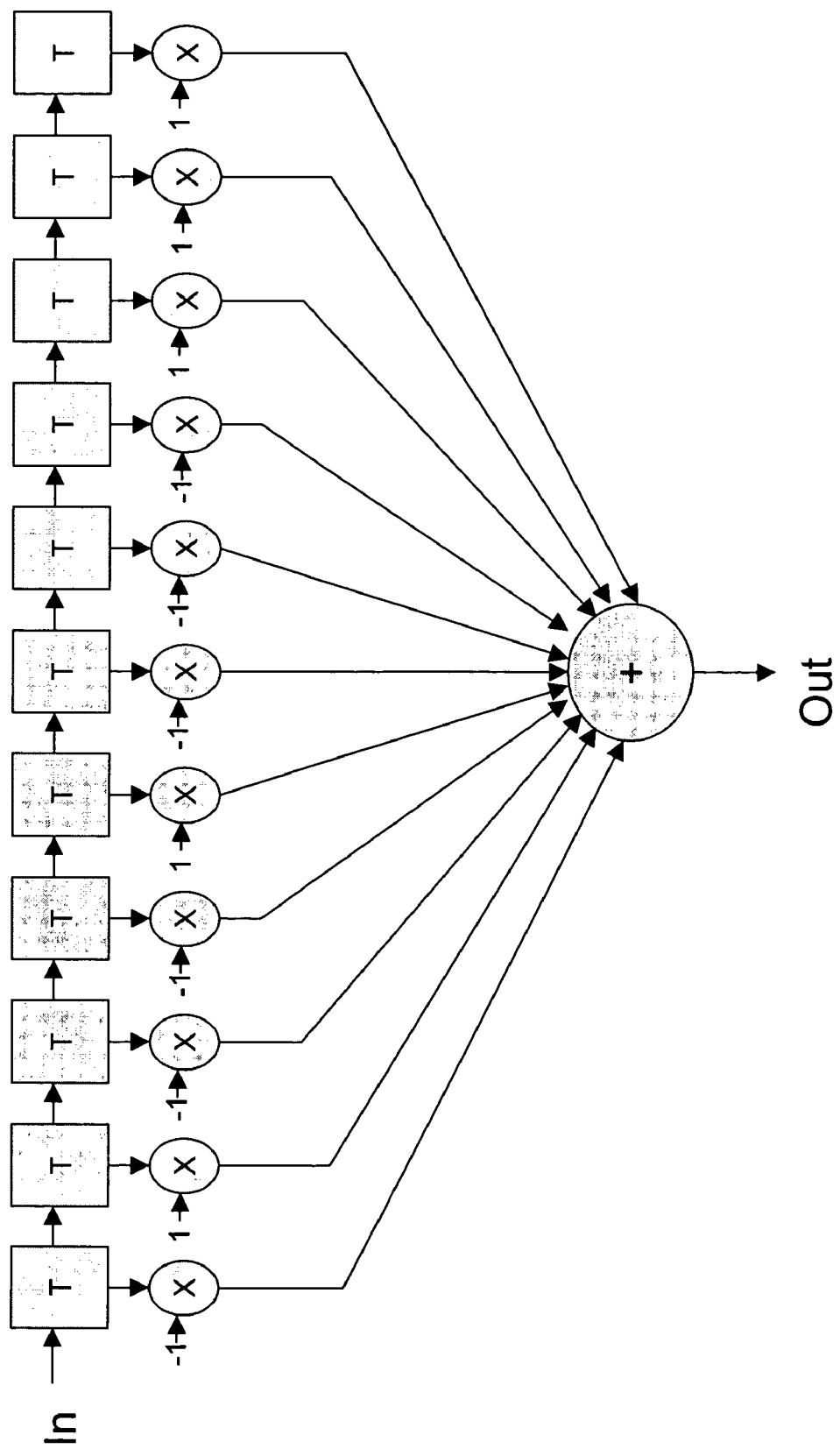
FIG. 7a show a Barker sequence detector, known in the prior art and included in the demodulator of FIG. 4.
Figure 7B:
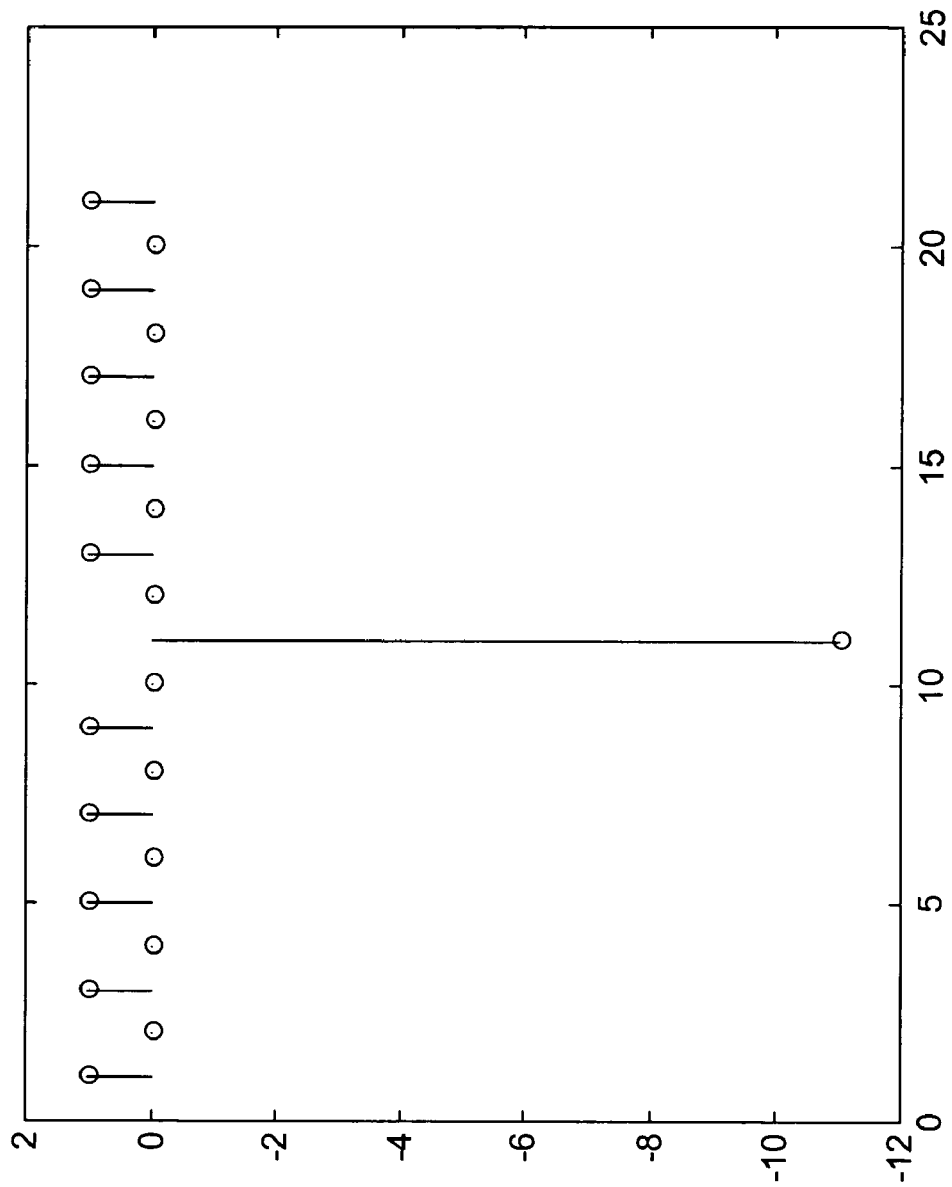
FIGS. 7b and 7c represent the output signal from the detector of FIG. 7a, during the reception of a Barker sequence of negative polarity (FIG. 7a) or positive polarity (FIG. 7b)
Figure 7C:
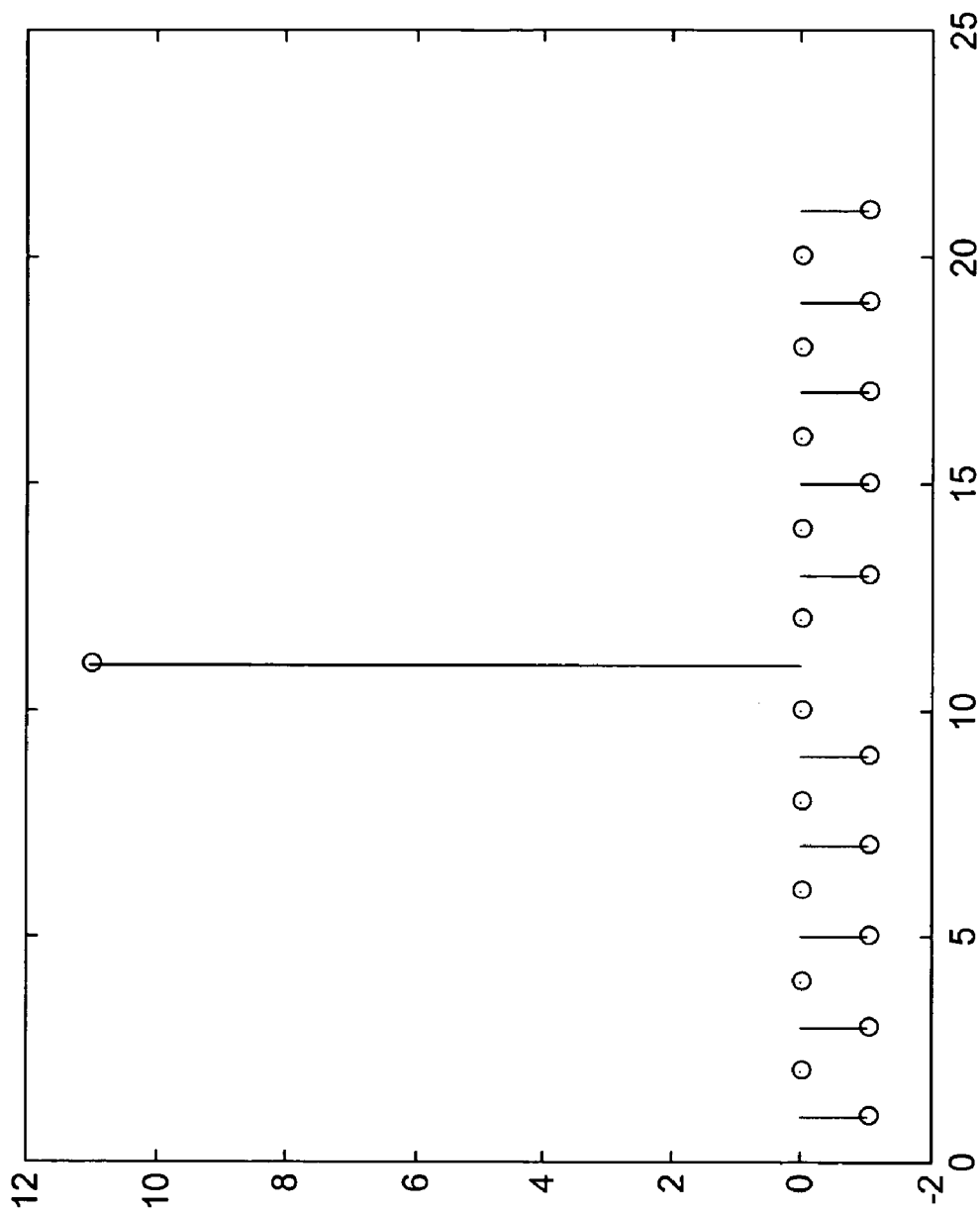

FIG. 7*a* shows a Barker sequence detector, known in the prior art and included in the demodulator of FIG. 4. FIGS. 7*b* and 7*c* represent the output signal from the detector of FIG. 7*a*, during the reception of a negative (FIG. 7*a*) or positive (FIG. 7*b*) polarity Barker sequence detector (FIG. 7*a*). This detector is based on a finite impulse response digital correlator filter whose coefficients are the temporal reverse of the Barker sequence with a length 11 (sequence of 11 symbols NRZ $\{1, 1, 1, -1, -1, -1, 1, -1, -1, 1, -1\}$). By connecting the output of this correlator signal with a threshold detector, efficient protection is obtained against false alarms. In one variant of the invention, the signal obtained at the output of the detector may be used to give a piece of information on synchronization to the clock recovery system.

The above description has given an example of a modulator according to the invention 300 (cf. FIG. 3) that can be used to modulate a carrier frequency (generated by the generator 310) to generate a modulated carrier frequency (modulated signal IF1). Similarly, a description has been given of an example of a demodulator according to the invention 400 (cf. FIG. 4) that can be used to demodulate a received modulated carrier frequency (modulated signal IF1), through a carrier frequency that has been generated (by the generator 401).

Figure 8:
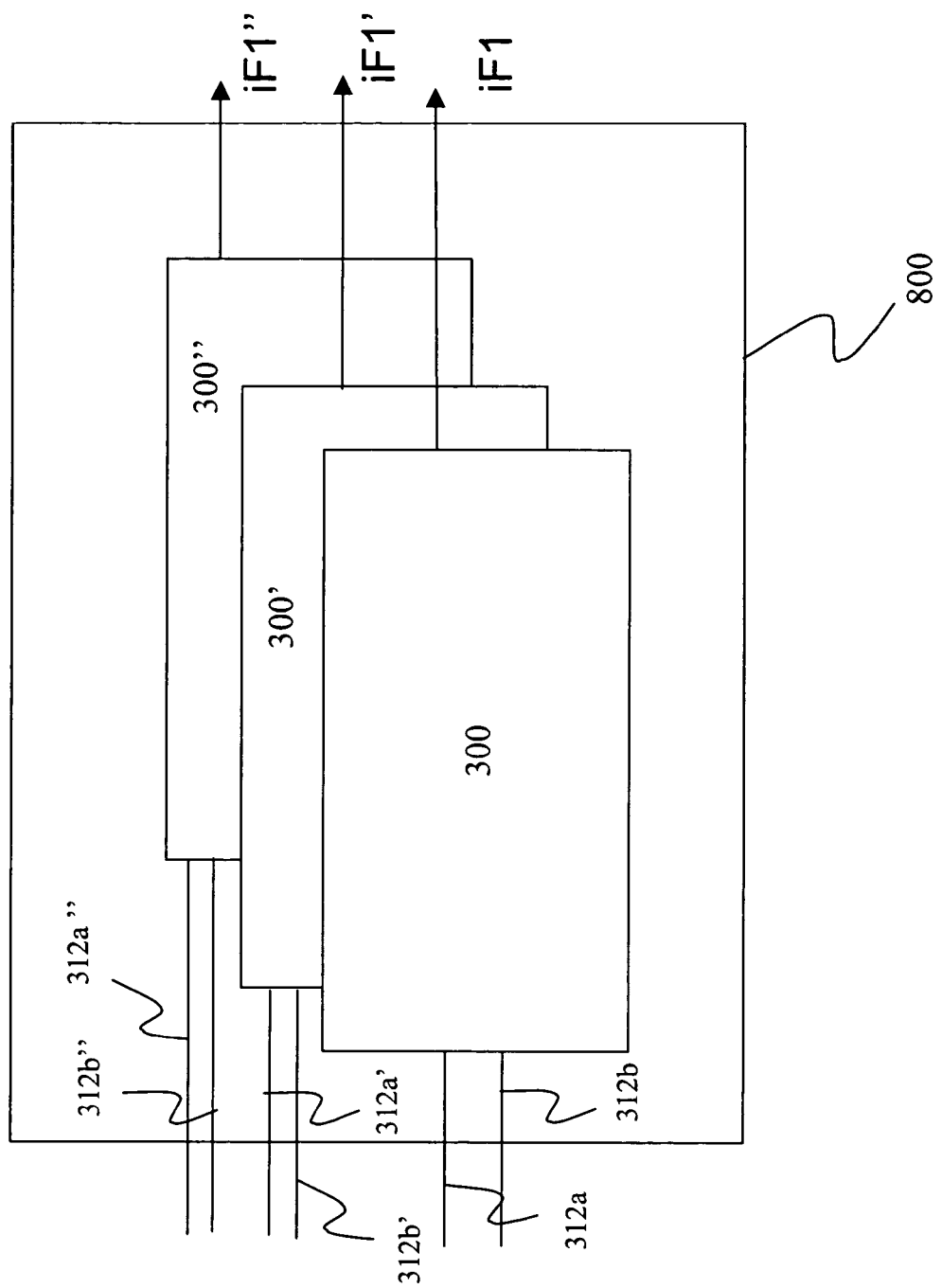
FIG. 8 shows an alternative embodiment of the modulator of the invention, enabling simultaneous working with several carrier frequencies.

As illustrated in FIG. 8, in one alternative embodiment, the modulator according to the invention 800 is used for the simultaneous processing of several carrier frequencies. For this purpose, it has several blocks 300, 300', 300" . . . in parallel, each corresponding to the example of a modulator described here above with reference to FIG. 3. Each of these blocks 300, 300', 300" . . . is connected to two pairs of wires (312*a*, 312*b*), (312*a'*, 312*b'*), (312*a"*, 312*b"*) and generates a modulated signal IF1, IF1', IF1".

Figure 9:
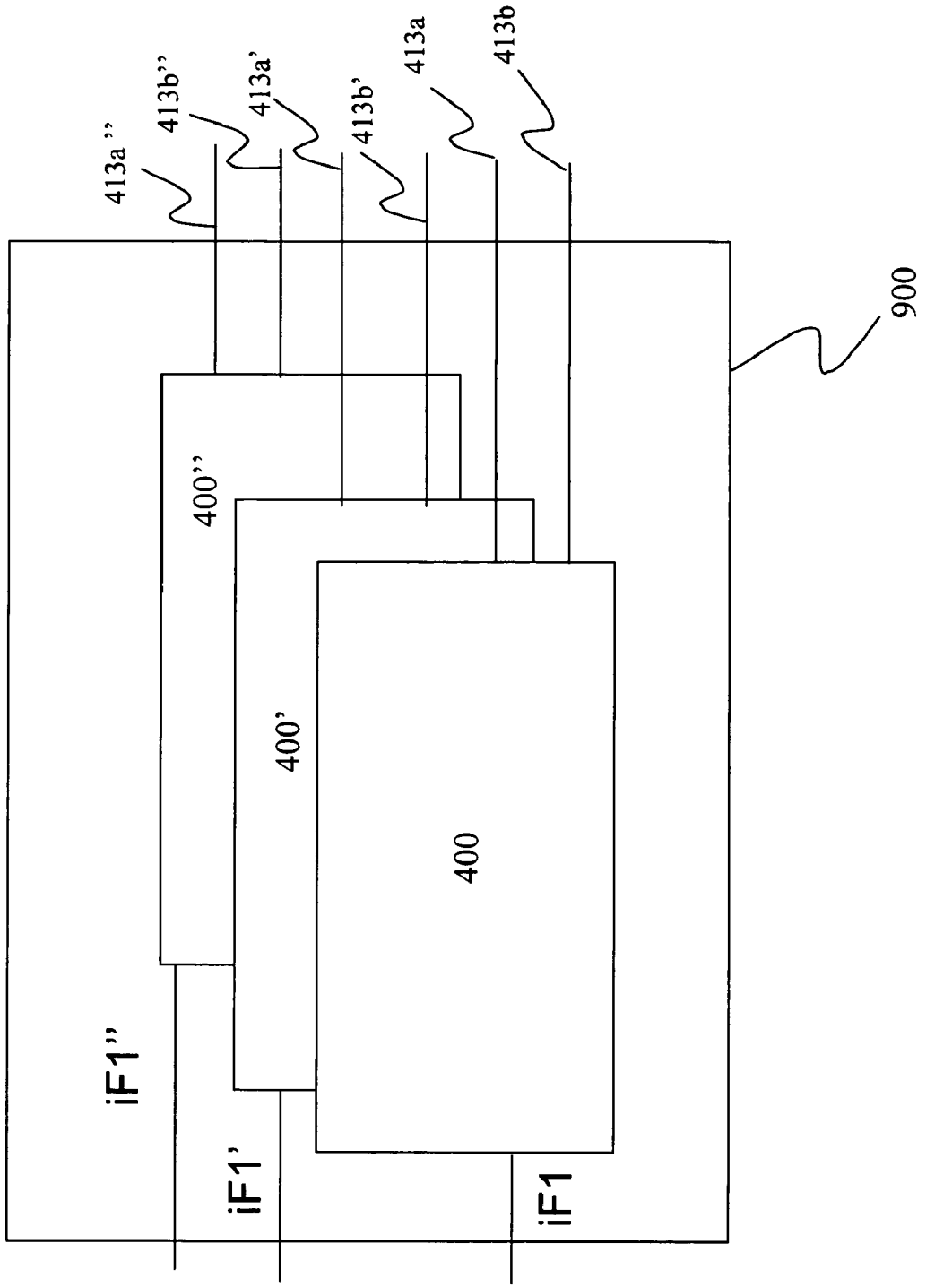
FIG. 9 illustrates an alternative embodiment of the demodulator according to the invention, enabling simultaneous working with several carrier frequencies.

As illustrated in FIG. 9, the corresponding variant of the demodulator according to the invention 900 includes several blocks 400, 400', 400" . . . in parallel, each corresponding to the example of a demodulator described here above with reference to FIG. 4. Each of these blocks 400, 400', 400" . . . receives a modulated signal IF1, IF1', IF1" and is connected to two pairs of wires (413*a*, 413*b*), (413*a'*, 413*b'*), (413*a"*, 413*b"*).

In order to avoid interference, the frequency spectra occupied by the different modulated carrier frequencies IF1, IF1', IF1" are separated, or else the different carrier frequencies include a fundamental carrier frequency of which each other carrier frequency is a multiple.

When a modulator 800 according to the above variant is included in a transmitter within which it co-operates with wireless sending means, it is possible to use either as many wireless sending means (for example of the tide described here above with reference to FIGS. 5 and 6) as there are carrier frequencies (and hence blocks 300, 300', 300" . . . in parallel) in the modulator 800. In order to reduce costs, it is also possible to use wireless sending means that are partially or totally common to certain or to all of the carrier frequencies. It may be recalled that the wireless sending means comprise for example first frequency transposition means and at least one first electrode (cf. FIG. 5) or a first antenna (cf. FIG. 6).

Similarly, when a demodulator 900 according to the above variant is included in a receiver within which it co-operates with wireless reception means, it is either possible to use as many wireless reception means (for example of the type described here above with reference to FIGS. 5 and 6) as there are carrier frequencies (and hence blocks 400, 400', 400" . . . in parallel) in the demodulator 900. In order to reduce costs, it is also possible to use wireless reception means partially or totally common to certain or all of the carrier frequencies. It may be recalled that the wireless reception means include, for example, second frequency transposition means and at least one second electrode (cf. FIG. 5) or one second antenna (cf. FIG. 6).

Although the invention has been described here above with reference to a limited number of embodiments, those skilled in the art will understand, from the present description, that other embodiments can be imagined without departing from the framework of the present invention. Consequently, the scope of the invention is limited only by the claims appended herewith.

What is claimed is:

1. A device for quadrature modulation of a carrier frequency, said device comprising:
   receiving means for receiving a first signal from a first wire of a wired communication link, and for receiving a second signal from a second wire of a wired communication link;
   insertion means for inserting a discrimination sequence in at least one of said first and second received signals, the discrimination sequence being specific to the signal in which said discrimination sequence is inserted so as to obtain first and second differentiated signals;
   modulating means for modulating the carrier frequency comprising first assigning means for assigning the first differentiated signal to one of an in-phase channel and a quadrature channel, and assigning the second differentiated signal to the other of the two channels; and
   wireless sending means for sending the modulated carrier frequency.

2. A modulation device according to claim 1, wherein said insertion means comprises:
   first detection means for detecting a predetermined source sequence in at least one of the signals coming from the first or second wire; and
   replacement means for replacing the predetermined source sequence detected by said first detection means with the corresponding discrimination sequence.

3. A modulation device according to claim 2, wherein said source sequence is a first synchronization sequence.

4. A modulation device according to claim 3, wherein each discrimination sequence is a second synchronization sequence adapted to wireless transmission.

5. A modulation device according to claim 4, wherein each discrimination sequence is a Barker sequence.

6. A modulation device according to claim 1, wherein said insertion means enable the insertion of:
   a first discrimination sequence, which is a Barker sequence of positive polarity, in the first signal, and
   a second discrimination sequence, which is a Barker sequence of negative polarity, in the second signal.

7. A modulation device according to claim 1, wherein this device modulates at least two carrier frequencies and generates at least two modulated carrier frequencies, and wherein the frequency spectra occupied by said at least two modulated carrier frequencies are separated.

8. A modulation device according to claim 1, wherein this device modulates at least two carrier frequencies and generates at least two modulated carrier frequencies, wherein said at least two carrier frequencies comprise a fundamental carrier frequency of which each other carrier frequency is a multiple.

9. A modulation device according to claim 1, wherein the wireless sending means comprises:
   first frequency transposition means for receiving said modulator carrier frequency and generating a final modulated carrier frequency; and
   at least one first electrode, placed on a first side of an electrically non-conductive partition wall and activated by said final modulated carrier frequency, said at least one first electrode being designed to co-operate with at least one second electrode included in a receiver and placed on a second side of said partition wall, facing said at least one first electrode, so that said receiver receives said finally modulated carrier frequency.

10. A modulation device according to claim 1, wherein the wireless sending means comprises:
    first frequency transposition means for receiving said modulator carrier frequency and generating a final modulated carrier frequency; and
    a first antenna activated by said final modulated carrier frequency.

11. A method performed by a device for quadrature modulation of a carrier frequency, the device performing the method comprising:
    receiving a first signal from a first wire of a wired communication link, and receiving a second signal from a second wire of a wired communication link;
    inserting a discrimination sequence in at least one of said first and second received signals, the discrimination sequence being specific to the signal in which said discrimination sequence is inserted so as to obtain first and second differentiated signals;
    modulating the carrier frequency including assigning the first differentiated signal to one of an in-phase channel and a quadrature channel, and assigning the second differentiated signal to the other of the two channels; and
    wirelessly sending the modulated carrier frequency.

* * * * *